United States Patent
Boxley et al.

(10) Patent No.: US 8,251,016 B2
(45) Date of Patent: Aug. 28, 2012

(54) ENVIRONMENTALLY-FRIENDLY ANIMAL LITTER

(75) Inventors: Chett Boxley, Park City, UT (US); Jessica McKelvie, Sandy, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 72 days.

(21) Appl. No.: 12/881,994

(22) Filed: Sep. 14, 2010

(65) Prior Publication Data

US 2011/0061598 A1    Mar. 17, 2011

Related U.S. Application Data

(60) Provisional application No. 61/242,612, filed on Sep. 15, 2009.

(51) Int. Cl.
*A01K 1/015* (2006.01)
(52) U.S. Cl. ........................................................ 119/173
(58) Field of Classification Search .................. 119/171, 119/172, 173
See application file for complete search history.

(56) References Cited

U.S. PATENT DOCUMENTS

| | | | |
|---|---|---|---|
| 3,941,536 A | 3/1976 | Akerlow | |
| 3,972,971 A | 8/1976 | Dantoni | |
| 4,129,094 A | 12/1978 | Stockel | |
| 4,157,696 A * | 6/1979 | Carlberg | 119/172 |
| 4,217,858 A | 8/1980 | Dantoni | |
| 4,311,115 A | 1/1982 | Litzinger | |
| 4,494,481 A | 1/1985 | Rodriguez et al. | |
| 4,494,482 A | 1/1985 | Arnold | |
| 4,506,628 A * | 3/1985 | Stockel | 119/173 |
| 4,517,919 A | 5/1985 | Benjamin et al. | |
| 4,622,920 A | 11/1986 | Goss | |
| 4,641,605 A | 2/1987 | Gordon | |
| 4,683,318 A | 7/1987 | Deffeves et al. | |
| 4,744,374 A | 5/1988 | Deffeves et al. | |
| 4,914,066 A | 4/1990 | Woodrum | |
| 5,109,805 A | 5/1992 | Baldry et al. | |
| 5,188,064 A | 2/1993 | House | |
| 5,207,830 A | 5/1993 | Cowan et al. | |
| 5,228,900 A | 7/1993 | Stephens et al. | |
| 5,325,816 A | 7/1994 | Pattengill et al. | |
| 5,415,131 A | 5/1995 | Dodman | |
| 5,482,007 A | 1/1996 | Kumlin | |
| 5,630,377 A | 5/1997 | Kumlin | |
| 5,900,258 A | 5/1999 | Engler | |
| 6,253,710 B1 | 7/2001 | Ward et al. | |

(Continued)

OTHER PUBLICATIONS

Hardjito et al., "On the Development of Fly Ash-Based Geopolymer Concrete," ACI Materials Journal (2004), available at http://petra.academia.edu/DjwantoroHardjito/Papers/479294/On_the_development_of_fly_ash-based_geopolymer_concrete.*

(Continued)

*Primary Examiner* — Rob Swiatek
*Assistant Examiner* — Lisa Tsang
(74) *Attorney, Agent, or Firm* — David Fonda

(57) ABSTRACT

An animal litter composition including geopolymerized ash particulates having a network of repeating aluminum-silicon units is described herein. Generally, the animal litter is made from a quantity of a pozzolanic ash mixed with a sufficient quantity of water and an alkaline activator to initiate a geopolymerization reaction that forms geopolymerized ash. After the geopolymerized ash is formed, it is dried, broken into particulates, and sieved to a desired size. These geopolymerized ash particulates are used to make a non-clumping or clumping animal litter. Odor control is accomplished with the addition of a urease inhibitor, pH buffer, an odor eliminating agent, and/or fragrance.

18 Claims, 2 Drawing Sheets

U.S. PATENT DOCUMENTS

| | | |
|---|---|---|
| 6,287,550 B1 | 9/2001 | Trinh et al. |
| 6,745,720 B2 | 6/2004 | Rasner et al. |
| 6,747,067 B2 | 6/2004 | Melnichuk et al. |
| 6,803,033 B2 | 10/2004 | McGee et al. |
| 6,964,704 B2 | 11/2005 | Cox et al. |
| 7,316,201 B2 | 1/2008 | Rasner et al. |
| 7,331,309 B2 * | 2/2008 | Burckbuchler, Jr. .......... 119/171 |
| 7,335,254 B2 | 2/2008 | Bruce et al. |
| 2004/0079293 A1 | 4/2004 | Rasner et al. |
| 2005/0005870 A1 | 1/2005 | Fritter et al. |
| 2005/0176599 A1 | 8/2005 | Bergquist et al. |
| 2006/0112894 A1 | 6/2006 | Ikegami et al. |
| 2006/0243212 A1 | 11/2006 | Jenkins et al. |
| 2007/0289543 A1 * | 12/2007 | Petska et al. .................. 119/173 |
| 2010/0132619 A1 * | 6/2010 | Falcone et al. ................ 119/173 |
| 2011/0303156 A1 * | 12/2011 | Sikka et al. ................... 119/165 |

OTHER PUBLICATIONS

Joo-Hyung, Heo "International Search Report", *International Search Report* for PCT/US2010/048799, (May 24, 2011),1-3.

Joo-Hyung, Heo "Written Opinion of the International Searching Authority", *Written Opinion* for PCT/US2010/048799, (May 24, 2011),1-4.

* cited by examiner

US 8,251,016 B2

ENVIRONMENTALLY-FRIENDLY ANIMAL LITTER

RELATED APPLICATION

This application claims the benefit of U.S. Provisional Patent Application Ser. No. 61/242,612 filed Sep. 15, 2009, entitled "Environmentally Friendly Animal Litter." This provisional application is expressly incorporated herein by reference.

U.S. GOVERNMENT INTEREST

This invention was made with government support under Contract No. DE-EE0000395 awarded by the U.S. Department of Energy. The government has certain rights in the invention.

TECHNICAL FIELD

The present disclosure relates generally to animal litters (such as cat litters). In particular, the present invention relates to an animal litter composition that is derived from a "fly ash" material or another similar material.

BACKGROUND

When domesticated animals, such as pets, live alongside humans, the animals' waste causes several problems, including the problems of unwanted odors, debris, and liquids. These problems are often solved through the use of an animal litter, such as a cat litter, that absorbs liquids and reduces odors.

A wide variety of animal litter products are currently commercially available that are made from various materials including, clays, silica gels, paper, wood chips etc. Some animal litters, such as those that include silica gel, are relatively costly. The performance of each type of animal litter varies with regard to their effectiveness at deodorizing and dehydrating animal waste. Additionally, many conventional animal litter products are made from materials that have a limited availability or are becoming less economically feasible due to increasing manufacturing and shipping costs.

Accordingly, an improved animal litter product (such as a low-cost, highly-effective odor and liquid absorbing animal litter product) is desirable and is disclosed herein.

SUMMARY

The present embodiments include methods for treating one or more pozzolanic ashes to render the ashes usable as an animal litter. In some embodiments, the pozzolanic ash is "fly ash," which is described in greater detail below. The present embodiments may also comprise a process for converting the pozzolanic ash into a geopolymerized ash and then using the geopolymerized ash in an animal litter product.

In some embodiments, the described methods include providing a pozzolanic ash; providing a sufficient quantity of an alkaline activator and water to initiate a geopolymerization reaction; mixing the pozzolanic ash, alkaline activator, and water to form a slurry; drying the slurry to form a geopolymerized ash; milling or otherwise breaking the dried geopolymerized ash into particulates; and sieving the particulates of the geopolymerized ash and collecting particulates of a desired size. The sized collection of particulates may then be used in an animal litter product. Other optional ingredients, such as clumping agents, pH buffers, odor eliminating agents, perfumes, or urease inhibitors may also be added to the animal litter product.

In the described methods, the pozzolanic ash may comprise any suitable ash that is capable of forming a cementitious compound when mixed with the described alkaline activator and water. Some examples of such ashes include fly ash, spray dryer ash, bottom ash, bark ash, bottom slag, boiler slag, and mixtures thereof.

The alkaline activator can be any chemical that has a sufficiently high pH and which is otherwise capable of initiating a geopolymerization reaction when the activator is reacted with the pozzolanic ash. Some examples of the alkaline activator include a metal carbonate, a metal silicate, a metal aluminate, a metal sulfate, a metal hydroxide, and mixtures thereof. In some embodiments, the alkaline activator comprises an alkali carbonate, such as sodium carbonate; an alkali hydroxide, such as sodium hydroxide; or mixtures thereof.

Once the geopolymerization reaction has occurred, the geopolymerized ash may be dried and broken into particulates. Such particulates may be passed through one or more sieves in order to collect particulates in a size range that is suitable for use in an animal litter. In one embodiment, the particulates are sieved to have a sieve size between about a −12 and about a +60 sieve size. In another embodiment, the particulates are sieved to have a sieve size between about a −6 and about a +30 sieve size. In another embodiment, the particulates are sieved to have a sieve size between about a −8 and about a +40 sieve size. In another embodiment, the particulates are sieved to have a sieve size between about a −10 and about a +50 sieve size.

DETAILED DESCRIPTION

Figure 1:
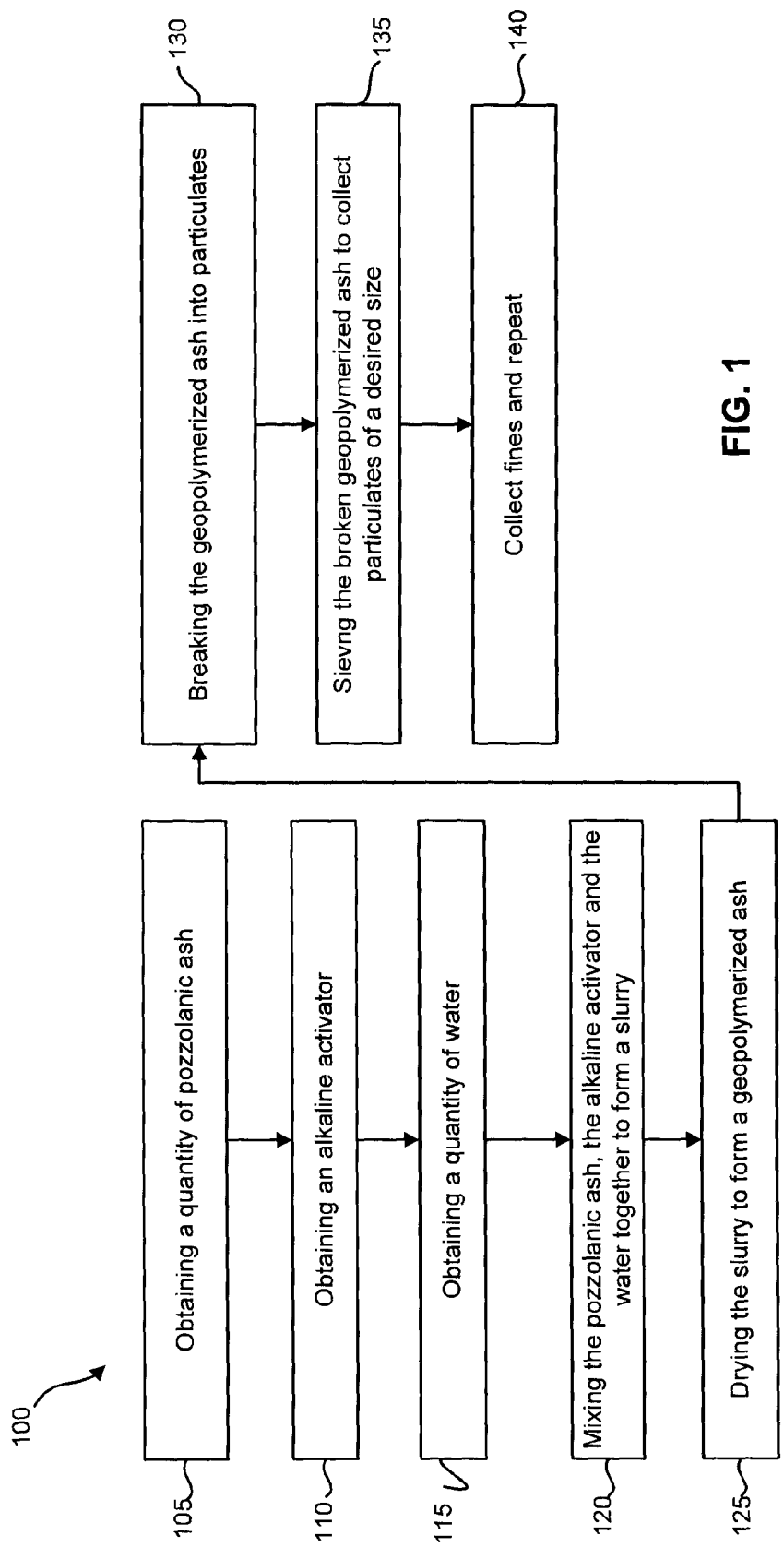
FIG. 1 is flow diagram illustrating an exemplary method for making an animal litter according to the present embodiments.

The present embodiments disclose an animal litter composition comprising geopolymerized ash particulates having a network of repeating aluminosilicate units, wherein the geopolymerized ash particulates have a sieve size between about a −12 sieve and about a +60 sieve. In some embodiments, the geopolymerized ash particulates have a sieve size between about a −6 sieve and about a +30 sieve. The geopolymerized ash particulates may be formed from a pozzolanic ash such as fly ash, bark ash, bottom ash, spray dryer ash, boiler slag, bottom slag, and mixtures thereof. The pozzolanic ash may comprise between about 0.1% and about 20% carbon, by weight. In other embodiments, the pozzolanic ash may comprise between about 0.1% and about 10% carbon, by weight. In some embodiments, the geopolymerized ash particulates have a BET surface area (as described herein) of greater than about 1 $m^2/g$. In other embodiments, the geopolymerized ash particulates have a BET surface area of greater than about 8 $m^2/g$. In further embodiments, the geopolymerized ash particulates have a BET surface area of greater than about 10 $m^2/g$. In further embodiments, a clumping agent, a pH buffer and/or a urease inhibitor may be added to the animal litter.

The present embodiments also disclose a method for making animal litter, the method comprising providing a quantity of a pozzolanic ash and mixing the pozzolanic ash with a sufficient quantity of an alkaline activator and water to initiate a geopolymerization reaction and to form a slurry material. In some embodiments, there is between about 0.5 and about 20 grams of the alkaline activator for every 100 grams of pozzolanic ash. Other embodiments are designed in which there is between about 3 and about 12 grams of the alkaline activator for every 100 grams of the quantity of pozzolanic ash.

The slurry may be dried to form a geopolymerized ash. In some embodiments, drying the slurry comprises heating the slurry to evaporate water from the slurry. The geopolymerized ash may also be broken into smaller-sized particulates. Further embodiments may be designed in which the method further comprises sieving the particulates of the geopolymerized ash with a first sieve and a second sieve, wherein the second sieve has a smaller sieve size than the first sieve. The portion of the geopolymerized ash particulates that pass through the second sieve are collected as "fine" particulates. The collected (fine) particulates may be then mixed with a second quantity of the alkaline activator and water sufficient to initiate a second geopolymerization reaction to form a second quantity of a geopolymerized ash.

Fly ash is the finely divided mineral residue resulting from the combustion of pulverized coal in coal-fired power plants. Fly ash may also include a mixture of different ashes produced by the combustion of other fuel materials, including but not limited to bark ash and bottom ash. Fly ash may comprise inorganic, incombustible matter present in the coal or fuel that has been fused during combustion into a glassy, part-amorphous/part-crystalline structure.

In many coal-burning processes, fly ash material is solidified while suspended in the exhaust gases and is collected by electrostatic precipitators or filter bags. Since the particles solidify while suspended in the exhaust gases, fly ash particles are generally spherical in shape and range in size from 0.5 μm to 100 μm. The particles are made up mostly of silicon dioxide ($SiO_2$), aluminum oxide ($Al_2O_3$) and iron oxide ($Fe_2O_3$), and are hence a suitable source of aluminum and silicon for geopolymers. They are also pozzolanic in nature such that the particles react with sodium hydroxide, an alkali hydroxide, and/or other basic materials (such as carbonates) to form cementitious compounds.

Fly ash has been classified into two classes (e.g., class F and class C), based on the chemical composition of the fly ash. According to ASTM C 618, the chemical requirements to classify any fly ash are shown in Table 1.

TABLE 1

The Chemical Requirements for Fly Ash Classification are provided below:

| Properties | Fly Ash Class | |
| --- | --- | --- |
|  | Class F | Class C |
| Minimum percentage of Silicon dioxide, aluminum oxide, iron oxide ($SiO_2 + Al_2O_3 + Fe_2O_3$) | 70.0 | 50.0 |
| Maxmimum percentage of Sulfur trioxide ($SO_3$) | 5.0 | 5.0 |
| Maxmimum percentage of Moisture Content, | 3.0 | 3.0 |
| Maxmimum percentage of material loss on ignition (LOI) | 6.0 | 6.0 |

Class F fly ash is produced from burning anthracite and bituminous coals. This fly ash has siliceous or siliceous and aluminous material, which itself possesses little or no cementitious value; however this siliceous or siliceous and aluminous material may, in finely divided form and in the presence of moisture, chemically react with sodium hydroxide at ordinary temperature to form cementitious compounds. Class C fly ash is produced normally from lignite and sub-bituminous coals, and some class C fly ashes may contain significant amounts (higher than 10% or even 20%) of calcium oxide (CaO) or lime. This class of fly ash, in addition to having pozzolanic properties, also has some cementitious properties (ASTM C 618-99). Alkali and sulfur-containing compounds ($SO_2$ or $SO_3$) contents are generally higher in spray dryer ash materials.

Color is one of the important physical properties of fly ash in terms of estimating the carbon content qualitatively. It is suggested that lighter colors indicate low carbon contents and darker colors suggest high amounts of organic content.

Coal combustion exhaust gases sometimes contain contaminants, such as heavy metals like mercury, which must be removed to meet environmental standards. This is often accomplished using activated carbon or other similar powdered sorbents. The activated carbon is usually collected by electrostatic precipitators or filter bags together with the fly ash, this carbon is in addition to the natural unburned carbon content from the coal combustion process. Hence, collected fly ash may be combined with carbon and adsorbed heavy metals. The carbon content of fly ash may range up to 50% by weight (for both added and unburned carbon), or more. Because bark ash has high carbon content, fly ash materials that contain some bark ash may have a high carbon content.

FIG. 1 illustrates a representative embodiment of a method for forming an animal litter comprising a geopolymerized ash using the starting materials described herein. The described method may be used to form any animal litter that comprises a geopolymerized ash.

Referring to FIG. 1, a flow chart is illustrated that shows an exemplary method 100 for forming an animal litter that contains a geopolymerized ash. Specifically, FIG. 1 shows obtaining 105 a quantity of pozzolanic ash and obtaining 110 an alkaline activator. Water is also obtained 115. The pozzolanic ash, the alkaline activator, and the water are mixed 120 together to form a slurry. The slurry may then be dried 125 to form a geopolymerized ash. The geopolymerized ash may be broken 130 into particulates. The broken geopolymerized ash may be sieved 135 to collect particulates of a desired size. Additionally, FIG. 1 shows that method 100 may continue by collecting 140 fine particulates of the geopolymerized ash and using those particulates as the pozzolanic ash to repeat the method 100. In order to provide a better understanding of the described method, the various elements of the method 100 are described below in more detail.

With respect to obtaining the pozzolanic ash (as shown at 105 in FIG. 1), the pozzolanic ash may comprise one or more of a variety of finely-divided mineral residues from the combustion of a solid fuel (such as coal), wherein the residues are capable of forming a cementitious compound. Generally, the described pozzolanic ash comprises aluminum and silicon. For instance, the pozzolanic ash typically comprises silicon dioxide ("$SiO_2$"), aluminum oxide ("$Al_2O_3$"), and iron oxide ("$Fe_2O_3$"). Some non-limiting examples of such pozzolanic ashes comprise fly ash, spray dryer ash ("SDA"), bottom ash, bark ash, bottom slag, boiler slag, municipal solid waste incererator ash, and mixtures thereof. In some exemplary embodiments, the pozzolanic ash comprises fly ash or SDA.

While fly ash from any suitable source can be used with the described method, fly ash may be obtained as a waste byproduct from certain combustion or chemical processes. For instance, fly ash and fly-ash-type products are commonly generated from the combustion of coal in power plants and in the manufacture of paper/pulp products. While the specific ingredients and concentration of ingredients in fly ash vary from one coal-combustion plant to another, fly ash typically contains inorganic, incombustible matter that was present in the coal or fuel that is fused together during combustion into a glassy, part-amorphous/part-crystalline structure. As fly ash is suspended in exhaust gases, it is often solidified before being collected by electrostatic precipitators or by filter bags. Because the particles solidify while they are suspended in the exhaust gases, fly ash particles are typically spherical in shape and range in size from about 0.5 µm to about 100 µm in diameter.

Where the pozzolanic ash comprises fly ash, the fly ash may be of any quality. For example, the fly ash can comprise a "premium-quality," a "standard-quality," and/or even a "low-quality" fly ash. Indeed, because low-quality fly ash is typically inexpensive as compared to premium-quality and standard-quality fly ash materials, use of a low-quality fly ash material may be preferred in some embodiments.

Where the pozzolanic ash comprises SDA, the SDA may have any suitable characteristic. As used herein, the term SDA may refer to a byproduct produced by a dry sorbent injection flue gas desulfurization (FGD) system. By way of explanation, many coal combustion processes utilize pollution control systems (such as FGD systems) to remove sulfur combustion products from gases. For example, many FGD systems include wet scrubbers, spray dry scrubbers, sorbent injectors, and a combined sulfur oxide (SOx) and nitrogen oxide (NOx) process. FGD sorbents include lime, limestone, sodium-based compounds, high-calcium coal fly ash and other materials. One known FGD system employs a dry sorbent injection process where the FGD sorbent is a powdered sodium sesquicarbonate that is blown into an air duct containing the flue gases. Sodium sesquicarbonate (which is also called trisodium hydrogendicarbonate, ($Na_3H(CO_3)_2$)) is a double salt of sodium bicarbonate and sodium carbonate ($NaHCO_3 \cdot Na_2CO_3$). The dihydrate sesquicarbonate ($NaHCO_3 \cdot Na_2CO_3 \cdot 2H_2O$) occurs in nature as the mineral trona. Thus, trona may be used in dry sorbent injection processes to remove the sulfur combustion products SOx ($SO_2$ and $SO_3$).

With respect to the SDA process, flue gases react with a powdered FGD sorbent, such as trona, hydrated lime, or sodium carbonate to neutralize the sulfur oxides (SOx) present in the flue gases and to form safe byproducts. The byproducts and any excess trona powder are typically removed from the flue gas stream using an electrostatic precipitator (ESP). The clean air is then discharged into the atmosphere through the exhaust stack. The material recovered in the ESP is known as SDA and includes a mixture of fly ash, reaction products such as neutralized SOx, as well as unreacted trona. While the precise composition of SDA may vary from one coal-combustion plant to another, SDA predominantly contains fly ash (about 70%) with remaining components being the neutralized SOx and unreacted trona. In some typical embodiments of SDA there is at least 2.5 wt. % unreacted trona. Indeed, in some instances, SDA samples contain at least about 10 wt. % unreacted trona.

No matter which type of pozzolanic ash (e.g., fly ash, SDA, etc.) is used to create the described animal litter, the pozzolanic ash may have any suitable amount of carbon that allows the pozzolanic ash to function as intended. Indeed, in some embodiments, the pozzolanic ash used to make the geopolymerized ash comprises less than about 20% carbon, by weight. In one embodiment, the pozzolanic ash used to make the geopolymerized ash comprised between about 0.1% and about 20% carbon. In other embodiments, the pozzolanic ash comprises less than about 15% carbon, by weight.

In still other embodiments, the pozzolanic ash comprises less than about 5% carbon, by weight. While the carbon may perform any suitable function, it is theorized that carbon in the pozzolanic ash may tend to increase the animal litter's ability to adsorb odors.

Referring now to the alkaline activator mentioned at 110 in FIG. 1, the alkaline activator may comprise any chemical that has a sufficiently high pH and which is otherwise capable of initiating a geopolymerization reaction when reacted with the pozzolanic ash. Moreover, while one or more ingredients of the alkaline activator may comprise pure ingredients, in some embodiments, the alkaline activator comprises recycled byproducts of industrial processes. Some examples of suitable components that may be used as the alkaline activator include metal carbonates, metal silicates, metal aluminates, metal sulfates, metal hydroxides, and mixtures thereof. In some embodiments, alkali metals, such as sodium or potassium, are used in the alkaline activator because of their availability and low cost. In some embodiments, the alkaline activator comprises an alkali carbonate, such as sodium carbonate ($Na_2CO_3$), an alkali hydroxide, such as sodium hydroxide (NaOH), or a mixture thereof. Table 2, which is listed below, shows some examples of pozzolanic ash as well as the exact amounts of sodium carbonate/sodium hydroxide that may be used as the alkaline activator in the present embodiments.

In the described method, any amount of alkaline activator that is capable of initiating a geopolymerization reaction when combined with water and the pozzolanic ash may be added. In some embodiments, between about 1 and about 20 parts of the alkaline activator may be added for every 100 parts of the pozzolanic ash, by dry weight.

As noted above, water is added 115 to the pozzolanic ash. Any amount of water that allows the pozzolanic ash, the alkaline activator, and water to be mixed as a homogenous solution may be used. The addition of the water may be used to form a slurry of ingredients. However, because some (or even all) of the added water needs to be later evaporated off, care may be taken to minimize the amount of water added. Thus, in some embodiments water is added to the pozzolanic ash and alkaline activator to form a solution in which only about 1% of the solution, by weight, comprises solid materials (e.g., the pozzolanic ash). In other embodiments, less water is added to the pozzolanic ash. In some embodiments, enough water is added to the pozzolanic ash and the alkaline activator to ensure that solid materials (e.g., pozzolanic ash) accounts for more than about 20% of the weight of the solution. In still other embodiments, enough water is added to the pozzolanic ash such that at least about 40% of the solution, by weight, would comprise solid materials (e.g., pozzolanic ash). In still other embodiments, enough water is added to the pozzolanic ash such that between about 60% and about 80% of the solution would comprise solid materials (e.g., pozzolanic ash).

Referring still to FIG. 1, the method 100 may continue by having the pozzolanic ash, alkaline activator, and water mixed 120 together to form a slurry. This mixing process can be accomplished in any suitable manner. For example, the mixing 120 may be accomplished by placing the components in a container and then using a mechanical mixer, drill, or other rotating member, to mix the contents for a time period. In one embodiment, the contents are mixed for about 5 minutes. Other embodiments may mix the contents for greater periods of time, such as, for example, mixing the contents for up to multiple days. In one example in which the alkaline activator initially comprises a dry crystalline or dry powder material, the alkaline activator may be first added to enough water to dissolve the activator. This aqueous solution comprising the dissolved alkaline activator may then be added to the pozzolanic ash and additional amounts of water may further be added, as necessary, to form a homogeneous slurry. The time needed to mix the materials may depend upon the particular embodiment.

Figure 2:
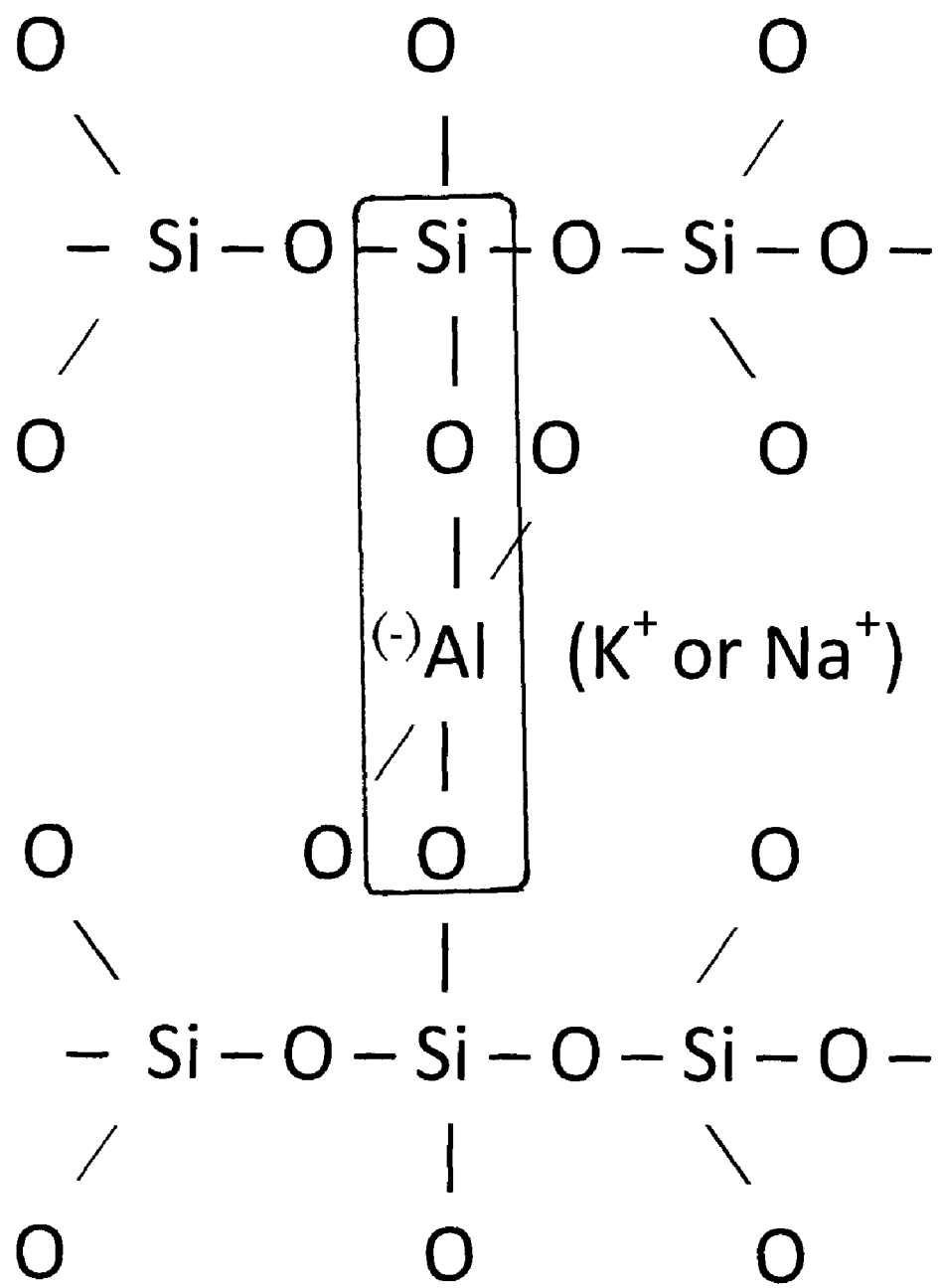
FIG. 2 illustrates a representative embodiment of geopolymer aluminosilicate repeating units found in geopolymerized ash formed according to the method of FIG. 1.

As the alkaline activator and water are mixed with the pozzolanic ash, the geopolymerization reaction begins. Specifically, geopolymerization occurs through the chemical dissolution of silica and alumina-based oxides within the pozzolanic ash. This dissolution occurs with the addition of the highly alkaline activator, followed by the subsequent re-condensation of various aluminosilicate oxides, which yield polymeric Si—O—Al—O bonds. Geopolymer materials may be three-dimensional aluminosilicate networks that form inorganic mineral polymers, which may contain a variety of amorphous and semi-crystalline phases. As used herein, the term geopolymer may represent a broad class of materials characterized by Al—Si repeating units. FIG. 2 shows an example of a repeating Si—O—Al—O unit (circled) that may be found in a geopolymer formed according to the present embodiments. A positively charge atom may be present to accomplish charge neutrality given the negative charge of the Aluminum atom. In one embodiment, the positively charges atom is Sodium. In other embodiments a Potassium atom may be used. It will be understood by one of skill in the art that any positively charged monovalent atom may be used.

Referring again to FIG. 1, the method 100 may continue by drying 125 the slurry formed from the mixture of the ash, the alkaline activator and the water to form solid geopolymerized ash. This drying process may be accomplished in any suitable manner, including, but not limited to, drying at room temperature, heat drying, and/or vacuum-drying the geopolymerized ash. In certain embodiments, the geopolymerized ash is dried at room temperature or at a higher temperature. Additionally, in some embodiments, to speed the drying process, the slurry of geopolymerized ash may be spread thin (such as a thin layer) in order to have an increased surface area from which water can evaporate. A drum dryer and/or pelletizer apparatus may also be used. The geopolymerized ash may be dried to any suitable extent. For example, in some embodiments, the geopolymerized ash may be dried until its residual moisture content is between about 0.1% to about 5% water, by weight.

The geopolymerized ash may be dried at any suitable temperature. In some embodiments, the geopolymerized ash may be dried at a temperature of less than about 400° Celsius (C). In other embodiments, the geopolymerized ash may be dried at temperatures less than about 250° C. In still other embodiments, the geopolymerized ash may be dried at a temperature of less than about 110° C. In other embodiments the geopolymerized ash may be dried at a temperature of about 100° C.±5° C. In yet other embodiments, the geopolymerized ash may be dried at a temperature of less than about 80° C. In one embodiment, the geopolymerized ash may be dried at a temperature about 75° C.±5° C. In some embodiments, the drying process operates to provide clumps of the geopolymerized ash that will have a diameter that is in the micron or millimeter size range.

Table 2 provides some examples of the pozzolanic ash, the activator used to form examples of geopolymerized ash. All of the examples provided in Table 2 were dried at room temperature.

TABLE 2

Examples of Geopolymerized Ash

| Sample Name | Type of Pozzolanic Ash | NaOH g/ 100 g of ash | Na$_2$CO$_3$ g/ 100 g of ash | % Solid Materials in Slurry |
|---|---|---|---|---|
| Pozzolanic Ash #1 | Class C | 1 | 2.5 | 67 |
| Pozzolanic Ash #2 | Class C | 3 | 3 | 68 |
| Pozzolanic Ash #3 | Class C | 6 | 0 | 71 |
| Pozzolanic Ash #4 | Class C | 0 | 6 | 67 |
| Pozzolanic Ash #5 | Class C | 6 | 6 | 71 |
| Pozzolanic Ash #6 | SDA | 6 | 0 | 70 |
| Pozzolanic Ash #7 | SDA | 10 | 0 | 64 |
| Pozzolanic Ash #8 | Class F | 1 | 2.5 | 69 |
| Pozzolanic Ash #9 | Class F | 6 | 6 | 69 |

Table 2 shows some exemplary embodiments in which between about 2 to about 12 parts of the alkaline activator were added for every 100 parts of the pozzolanic ash, by dry weight. In still other embodiments, however, between about 3.5 and about 12 grams of the alkaline activator may be added for every 100 grams of the pozzolanic ash, by dry weight. For instance, Table 2 shows that for every 100 grams of Pozzolanic Ash #4, 0 gram of NaOH and 6 grams of Na$_2$CO$_3$ are added to the ash.

Table 2 also shows several embodiments in which the amount of water added is limited such that the solid materials (e.g., pozzolanic ash and dry activator) account for between about 36% (e.g., in the case of Pozzolanic Ash #7) and about 29% (e.g., in the case of Pozzolanic Ashes #5 and #3) of the solution, by weight. All of the embodiments shown in Table 2 are exemplary and fall within the scope of at least one embodiment of the present disclosure.

Referring once again to FIG. 1, the geopolymerized ash formed from the water, alkaline activator and pozzolanic ash may be broken 130 into particulates. Any method for breaking and/or crushing the material may be used. In one embodiment, the material may be tape cast onto a sheet made of mylar or other material. In this embodiment, a blade is then contacted with the material (along with a quantity of air) to break the material into smaller fragments. Other types of crushing devices may also be used. In other embodiments, the material may be broken by hand.

FIG. 1 further shows the method 100 may have the particulates of geopolymerized ash be sieved 135. The particulates of geopolymerized ash can be sorted with multiple sieves to any size range that is suitable for use in an animal litter product. In some embodiments, the broken geopolymerized ash may be sieved to have a sieve size between about a −12 sieve (about 1.7 millimeters (mm)) and about a +60 sieve (about 0.25 mm). In still other embodiments, the particulates of geopolymerized ash may be sieved to have a size range between about a −6 sieve (about 3.35 mm) and about a +30 sieve (about 0.6 mm). In still other embodiments, the particulates of geopolymerized ash may be sieved to have a size range between about a −12 sieve (about 3.35 mm) and about a +80 sieve Any particles that are too large to meet the size requirements may be further crushed or reduced in size to meet the desired size requirements.

FIG. 1 shows the method 100 optionally continues by having particulates of the geopolymerized ash that pass through the smallest sieve (e.g., fines) be collected 140 and used to repeat the process. The fines can be used alone or with additional pozzolanic ash when the process is repeated. Indeed, in some embodiments, the fines may be mixed with a suitable amount of a pozzolanic ash that has not been treated with the alkaline activator and water. This process of collecting and recycling the fines may be repeated multiple times, as desired. By having the "fine" or smaller diameter particles pass through the sieve (and thus not used), the cat litter that is produced may have particulates that are large enough such that they do not form an inhalable dust when poured out of the container/bag.

The described method may be varied in any suitable manner. For instance, portions of the method 100 may be removed and/or be reordered in any suitable manner. In one example, instead of providing the pozzolanic ash before providing the alkaline activator and the water, the water and/or alkaline activator are provided before the pozzolanic ash. Accordingly, in this example, the pozzolanic ash may be added to the water and/or the alkaline activator. In another example, the geopolymerized ash may be broken before it is dried to its final moisture content.

In still another example, where SDA (spray dryer ash) is used as the pozzolanic ash, a smaller amount of the alkaline activator may be used to form the geopolymerized ash than that which is necessary for other types of pozzolanic ash materials (such as class C fly ash or class F fly ash). The reason for this is that class C or class F fly ash is substantially free from unreacted trona whereas SDA may include a quantity of unreacted trona. Because unreacted trona in the SDA contains carbonate compounds that can help initiate a geopolymerization reaction, the alkaline activator used to geopolymerize SDA may comprise less alkali carbonate (such as less sodium carbonate ($Na_2CO_3$)) than would be required for class C or F fly ash.

In addition to the previously mentioned ingredients, the described method may also be modified to include additional ingredients. For example, in one embodiment, a quantity of an additional ingredient, such as bentonite, vermiculite, perlite, aluminosilicate, and/or kyanite, may be added to the geopolymerized ash. In yet other instances, a scent releasing agent (e.g., a perfume) may be added to the geopolymerized ash to help the animal litter deodorize smells from animal waste. The additional ingredients may be added at any suitable time during the method. For example, additional ingredients may be added to the geopolymerized ash while the ash is still wet, semi-dry, and/or dry.

In addition to the previously mentioned benefits, the described animal litter and associated method for making the animal litter can include several other beneficial characteristics. For example, pozzolanic ashes are typically landfilled, and thus the present methods provide a low-cost mechanism to recycle these pozzolanic ash materials. By providing this use for the pozzolanic ashes, the described methods can reduce pollution and the demand for landfill space. Likewise, the present embodiments provide a way to recycle/reuse spray dryer ash, which is a material that currently is not being recycled. For this reason, the embodiments of the present disclosure may be environmentally friendly. Further, currently available cat litters comprise bentonite clay materials, which are extracted from the earth via strip mining processes. However, the present embodiments may be designed in which such bentonite clay materials are not used, or are used in limited amounts (such as a clumping additive), thereby reducing the amount of material that must be extracted via strip mining.

In another example, the described geopolymerization reaction acts to entrap unwanted and heavy metals, such as Hg, As, Fe, Mn, Zn, Cr, Co, Pb, Cu, V, and Mg, within the geopolymerized ash. Accordingly, the described methods prevent such metals from leaching into the environment and from causing harm to animals.

In still another example, the described animal litters are effective at reducing odor (e.g., absorbing ammonia from animal urine) and absorbing liquids. In still another example, particulates of the animal litter produced by the described method can adhere and aggregate together to form clumps after being wetted and being allowed to dry for a period of time. Accordingly, animal waste can be easily removed from the described animal litter (by "scooping out" or extracting the clump) without requiring all of the animal litter to be changed.

More specifically, the present embodiments may be used to create a "clumping" or a "non-clumping" animal litter. A "clumping" litter is one that forms "clumps" (clustered mass) when wetted (such as by animal urine). In order to produce a clumping litter, a clumping agent may be added to the litter. A biopolymer, especially a polysaccharide, clumping agent can be added to create a "clumping" animal litter. Three main categories of polysaccharides exist: storage polysaccharides, structural polysaccharides, and bacterial polysaccharides. Examples of storage polysaccharides include any vegetable starches such as starches from corn, rice, cassava (tapioca), potato, arrowroot, or sago. Starches can be modified further to produce polysaccharide dextrins such as maltodextrin. Structural polysaccharides are characterized as a type of cellulose or chitin. Examples of cellulose polysaccharides are guar gum, alginate (esp. sodium alginate), carageenan, cellulose fibers, pectin and cellulose derivatives such as hydroxyethyl cellulose, carboxymethyl celluse (CMC), and hydroxypropyl methyl cellulose (HPMC). Examples of bacterial polysaccharides include, but are not limited to, xanthan gum, welan gum, gellan gum, pullulan, and diutan gum. Many of these polysaccharides are known binding, thickening, gelling, or emulsifying agents. Any one or combination of these polymers can be used to aid agglomeration upon wetting. In addition to the polymers listed, sodium bentonite, which is a swelling clay, can be used as a clumping additive. Commercial kitty litter may also be used as a clumping agent.

Additionally, in order to inhibit odor caused by urine or urea that is associated with animal urine, one or more urease inhibitors may be added to the animal litter product. These urease inhibitors may be designed to reduce the ability of urea to decompose (into ammonia) and thereby produce undesirable gaseous odors. Examples of urease inhibitors include agrotain and boric acid. Other urease inhibitors include hyroxamic acid (RC(O)NH—OH) including acetohydroxamic acid, phosphorodiamidate including phenyl phosphorodiamidate, 4-chlorophosphorodiamidate, and N-(n-butyl) thiophosphoric triamide, imidazoles, phophazene, and ecabet sodium (which is a Japanese anti-ulcer drug). Further examples of urease inhibitors include 2/5-dimethyl-1,4-benzoquinone; 1,4-benzoquinone; hydroquinone; 2,5-dichloro-1,4-benzoquinone; phenylmercuric acetate; catechol; N-(4-nitrophenyl)-phosphoric triamide; N-(diaminophosphinyl) benzeneaceteamide; 4-chloro-N-(diaminosphosphinyl) benezamide; N-3-(trifluoromethyl-phenyl)phosphoric triamide; 4-fluoro-N-(diaminosphosphinyl)-benezamide, 4-cyano-N-(diaminophosphinyl)benezamide; N-(diaminophosphinyl)-3-pyridinecarbonamide; N-(diaminophosphinyl)-benzamide; N-phenylphosphoric triamide, phosphorodiamidic acid; N-(n-butyl)thiophosphoric triamide; thiophosphoric triamide, 4-chlorophenylphosphorodiamidate, 2,4-diphenoxy-2,4,6,6-tetraminocyclotriphosphazene, and 2-phenoxy-2,4,4,6,6-pentaminocyclotriphophazene.

In order to further decrease undesirable odors associated with animal litters, perfumes and/or pleasant-smelling chemicals may also be added. Further, a pH buffer may also be added to further reduce the ammonia production from urea. This pH buffer, in some embodiments, may be designed to lower the pH of the animal litter, which will convert some or all of the ammonia gas ($NH_3$) into ammonium ions ($NH_4^+$) and may thus reduce the ability of gaseous ammonia to be emitted from the composition. In addition to urease inhibitors and pH buffers, odor eliminating agents may be used. These include but are not limited to zeolites, cyclodextrins, citric acid, silica, sodium sesquicarbonate, talc, soda ash, and borax.

In some embodiments, the formed animal litter (such as cat litter or kitty litter) may have one or more (or even all) of the following properties:

- Absorbency—the higher the absorbency of the litter, the lower the amount of odor that may be associated with the urine or fecal matter in the litter box;
- Clumpability—clumpable animal litters allow for easy removal of clumps of waste, thereby reducing odor and allow for longer use of the animal litter (e.g., changing the litter box less often). Also, using a clumping litter allows less litter to be used, thereby making the litter more environmentally-friendly and economical. Further, the clumps should remain solid over time to allow for easier scooping. At the same time, the clump should be soft-enough to allow it to be flushed down a toilet.
- Ability to remove or mask odor—this may be accomplished through the use of additives such as activated carbon, zeolites, dessicants, anti-bacterial agents, pH adjusters, urease inhibitors, perfumes, silica gel, alumina, etc.;
- High Animal acceptance—animals, and especially cats, may be drawn to the litter box to excrete waste;
- Lower density—litters that are made of less dense materials may be easier to transport, easier to store and easier for consumers to carry and buy in bulk (and are therefore less expensive) but may still remain in the litter box and may not be "tracked" or carried by the animal throughout the house; and
- "non-dusty" litters that have larger particles and/or a dedusting spray or additive added such that the litter does not form a messy dust when poured into the litter box.

The following examples are given to illustrate various embodiments within the scope of the present disclosure. These are given by way of example only, and it is understood that the following examples are not comprehensive or exhaustive of the many types of embodiments that can be prepared.

Examples

Animal litters containing geopolymerized ashes produced from the recipes supplied in Table 2 were tested and compared against several conventional cat litters.

For example, the absorbency capabilities of animal litters were tested. The results from these tests are shown below in Table 3.

TABLE 3

Comparison of Animal Litters Comprising Geopolymerized Ashes Produced According to the Specifications of Table 2 and Conventional Animal Litters.

| Sample Name | BET Surface Area ($m^2/g$) |
|---|---|
| Pozzolanic Ash #1 | 12.09 |
| Pozzolanic Ash #5 | 14.6026 |
| Pozzolanic Ash #6 | 9.2351 |
| Pozzolanic Ash #7 | 12.3891 |
| Arm & Hammer Super Scoop ® | 20.2726 |

TABLE 3-continued

Comparison of Animal Litters Comprising Geopolymerized Ashes Produced According to the Specifications of Table 2 and Conventional Animal Litters.

| Sample Name | BET Surface Area ($m^2/g$) |
|---|---|
| Purina Tidy Cat ® | 61.1311 |
| Fresh Step Scoop ® | 40.7914 |
| Tidy Cat Non-Clump ® | 39.7267 |

Geopolymerized Avg. SA 12.0792
Commercial Litter Avg. SA 40.48045

In Table 3, BET surface area refers to the total surface area of the sample. BET surface area may be measured by gas sorption of an inert gas, such as nitrogen, on the clean surface of dry solid powders. The amount of gas adsorbed at a given pressure is used to determine the surface area and is referred to as the BET surface area. BET surface area gives an insight into the porosity of our material. Highly porous materials tend to be more absorptive. Specifically, Table 3 shows that, in some embodiments, animal litters made according to the method of FIG. 1 may have an average external surface area that is greater than about 9-14 $m^2/g$. Table 3 further shows that, in some embodiments, animal litters made according to the described method may have an average external surface area that is greater than about 12 $m^2/g$.

A variety of additional tests were performed to test the "clumpability" of animal litters made from geopolymerized ashes, and more particularly from Class C fly ash, class F fly ash and SDA. The particular geopolymerized ash was made using a specific percentage of the alkaline activator and was sized with a −6 to +30 sieve, as described herein. In general, the alkaline activator was an aqueous solution of NaOH or NaOH mixed with $Na_2CO_3$. (The exact concentration of the activator solution is given in each example). For each batch of animal litter, 10 mL of deionized water was added to the sample to simulate cat urine. The ability of the litter to form clumps, based upon the addition of the water, was then rated using the following "clumpability" scale:

0-1=No clumping;

1-2=Clump crumbles easily 2-3=Clump breaks into smaller clumps 3-4=Slight crumbling of the clump 4-5=Solid, stable clump This scale was developed because a desirable animal litter will form a clump quickly and will stay in the clump form over time so that the user can easily scoop the clump when changing the litter box. Using this scale, the litter was analyzed at 4 different times:

0 minutes (immediately after contact with the deionized water)

5 minutes after contact with the deionized water 60 minutes after contact with the deionized water 48 hours (or more) after contact with the deionized water Thus, each litter sample has four different scores (one for each time) on the 0-5 rating scale. A "perfect" score for each time period would be a "5" whereas the total "perfect" composite score is 20. A "4" rating for a cat litter sample is considered an acceptable rating for each time period and a "16" composite score is also acceptable. Below is a table (Table 4) that indicates that "clumpability" test results for commercially available litters using the score parameters defined herein:

TABLE 4

Clumpability Test Results for Commercially Available Cat Litters

| Sample | Clump Rating at 0 Minutes | Clump Rating at 5 Minutes | Clump Rating at 60 Minutes | Clump Rating at 48 hours or more | Total Composite Score |
|---|---|---|---|---|---|
| Tidy Cat Scoopable | 5 | 5 | 5 | 5 | 20 |
| Fresh Step Scoopable | 5 | 5 | 5 | 5 | 20 |
| Arm & Hammer Super Scoop | 5 | 5 | 5 | 5 | 20 |
| Tidy Cats Clay Litter | 0 | 0 | 0 | 0 | 0 |

As can be seen from Table 4, the commercially available "scoopable" cat litters all have a perfect composite score of "20" and display excellent clumpability.

Using the samples prepared in Table 5, various animal litters were prepared and mixed with a quantity of commercial kitty litter (which is essentially a bentonite clay clumping additive added to the fly ash litter). The following table illustrates the results and gives the total composite score for each test:

TABLE 5

Results Using the Clumpability Scale

| Sample Name | No Additive | 10% | 20% | 30% | 40% | 50% |
|---|---|---|---|---|---|---|
| Pozzolanic Ash #1 | 12 | 15 | 16 | 17 | 20 | 20 |
| Pozzolanic Ash #2 | 9 | 11 | 15 | 17 | 19 | 20 |
| Pozzolanic Ash #3 | 0 | No Data | No Data | No Data | No Data | No Data |
| Pozzolanic Ash #4 | 12 | No Data | No Data | No Data | No Data | No Data |
| Pozzolanic Ash #5 | 0 | 5 | 9 | 10 | 19 | 20 |
| Pozzolanic Ash #6 | 0 | 3 | 9 | 15 | 18 | 20 |
| Pozzolanic Ash #7 | 0 | 3 | 6 | 15 | 18 | 19 |
| Pozzolanic Ash #8 | 0 | 9 | 11 | 15 | 17 | 18 |
| Pozzolanic Ash #9 | 6 | 6 | 10 | 17 | 19 | 20 |

Under one interpretation, the results of these clumping tests may be summarized as follows:

Any fly ash (Class C or Class F) litter that is mixed with 40 or 50% bentonite clay litter will have acceptable clumping;

These results further indicate that using bentonite clay is a good clumping agent for litters that comprise at least 40-50% bentonite clay (and only 50-60% geopolymerized ash). However, for embodiments in which the percentage of geopolymerized ash is higher than 50-60%, a different clumping agent may be used.

Additional tests involving other clumping additives were also performed. Specifically, tapioca granules, and Xanthan gum were tested as clumping agents. In performing these tests, 150 grams of a litter product were prepared with the clumping agent added in the proportions listed below. The ability of this litter product was then tested using the clumping scale (after the addition of 10 mL of deionized water). The following table indicates the results:

TABLE 6

Clumping Agent Test regarding Tapioca and Xanthan Gum

| Sample Name | 1% Xanthan Gum | 10% Tapioca | 20% Tapioca | 30% Tapioca |
|---|---|---|---|---|
| Pozzolanic Ash #2 | 19 | 16 | No Data | No Data |
| Pozzolanic Ash #3 | 17 | 19 | No Data | No Data |
| Pozzolanic Ash #5 | 18 | 16 | 20 | 19 |
| Pozzolanic Ash #6 | 18 | No Data | No Data | No Data |

The results of Table 6 indicate, under one interpretation, that tapioca, in its granular form, is an excellent clumping agent for fly ash litter products. Xanthan gum is an excellent clumping agent as it provides acceptable results, even at 1%. The "clumps" associated with the Xanthan gum may not be as hard as the clumps formed using tapioca flakes, but such clumps do withstand scooping.

Testing has also been performed on the present embodiments of animal litter products to determine the Cation Exchange Capacity ("CEC") of these products. These results are provided below. The following abbreviations are used for simplicity in the following table:

BDL=below detection limits.
SDA=Spray Dryer Ash.

TABLE 7

Cation Exchange Capacity Results for Various
Fly Ash and Cat Litter Products

| Sample Name | Type of Pozzolanic Ash | CEC (meq/g) |
|---|---|---|
| Untreated Pozzolanic Ash #1-5 | Class C | BDL < 0.018 |
| Untreated Pozzolanic Ash #6 | SDA | BDL < 0.018 |
| Pozzolanic Ash #1 | Class C | 0.05 ± 0.02 |
| Pozzolanic Ash #2 | Class C | 0.11 ± 0.02 |
| Pozzolanic Ash #3 | Class C | 0.08 ± 0.01 |
| Pozzolanic Ash #4 | Class C | 0.039 ± 0.005 |
| Pozzolanic Ash #5 | Class C | 0.26 ± 0.03 |
| Pozzolanic Ash #6 | SDA | 0.24 ± 0.03 |
| Arm & Hammer Super Scoop ® | N/A | 0.8 ± 0.1 |
| Purina Tidy Cat ® | N/A | 0.30 ± 0.04 |
| Fresh Step Scoop ® | N/A | 0.53 ± 0.07 |

All fly ash samples, as received, result in a CEC<0.03 meq/g. Treatment conditions to agglomerate fly ash into litter (geopolymerization) will increase those to CEC between 0.04 to 0.3 meq/g and potentially higher as treatment conditions are optimized. It is believed that the addition of an odor eliminating agent will increase these values to a CEC that is comparable to commercial kitty litters that contain odor controlling substances (characterized by a CEC of 0.3 to 0.8 meq/g).

The bulk density of the animal litter products were also tested. This bulk density data is found in Table 8.

TABLE 8

Bulk Density Data for Various Fly Ash and Cat Litter Products

| Sample Name | Bulk Density (lb/ft$^3$) |
|---|---|
| Pozzolanic Ash #1 | 63.2 ± 0.5 |
| Pozzolanic Ash #2 | 65.8 ± 0.5 |
| Pozzolanic Ash #3 | 64.7 ± 0.2 |
| Pozzolanic Ash #4 | 56.3 ± 0.3 |
| Pozzolanic Ash #5 | 59.8 ± 0.4 |
| Pozzolanic Ash #6 | 55.6 ± 0.4 |
| Pozzolanic Ash #7 | No Data |
| Pozzolanic Ash #8 | No Data |
| Pozzolanic Ash #9 | No Data |
| Arm & Hammer Super Scoop ® | 72.5 ± 0.9 |
| Purina Tidy Cat ® | 57.8 ± 0.2 |
| Fresh Step Scoop ® | 74.3 ± 0.1 |

Pozzolanic Avg. Bulk Density 60.9
Commercial Avg. Bulk Density 68.2

It has been found that the difference in the concentration of alkaline activator may be significant. From a cost perspective, it may be desirable to use as little of the alkaline additive as possible. However, using little amounts of additive may increase the amount of "dust" in the cat litter, thereby increasing the "dust on pour" amount. ("Dust on pour" is an industry used term that measures how much dust is emitted during the pouring process.) Emitting dust from the cat litter product, especially when it is poured into the litter box, may be undesirable to consumers as it may make the "pouring" process messy. Accordingly, using a greater amount of additive, such as up to a solution that contains about 12% alkaline additive, may reduce the dust associated with the litter product and may lower the "dust on pour" amount of each litter. It has been found that, in some embodiments, a 6% solution of the alkaline additive may be appropriate. Percent dust is quantified by sieving 100 g of fly ash animal litter with a U.S. Standard No. 100 sieve and collecting all the material that passes through. The −100 fines collected is the percent dust in the animal litter. It is also believed that clumping is proportional to % Dust (before adding any sort of clumping agent). The higher the dust (without the clumping agent), the better it may clump.

Table 9, listed below, indicates the percentage of "dust" that is found in the animal litters made herein:

TABLE 9

Table Dust Percentage Data for Various
Fly Ash and Cat Litter Products

| Sample Name | % Dust |
|---|---|
| Pozzolanic Ash #1 | 11 |
| Pozzolanic Ash #2 | 1.8 |
| Pozzolanic Ash #3 | 0.56 |
| Pozzolanic Ash #4 | 1.63 |
| Pozzolanic Ash #5 | 0.6 |
| Pozzolanic Ash #6 | 2.1 |
| Pozzolanic Ash #7 | 2.1 |
| Pozzolanic Ash #8 | 6 |
| Pozzolanic Ash #9 | No Data |
| Tidy Cat Non-Clump ® | 0.04 |
| Arm & Hammer Super Scoop ® | 0.32 |
| Fresh Step Scoop ® | 0.6 |
| Purina Tidy Cat ® | 0.05 |

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An animal litter composition, comprising:
   geopolymerized ash particulates having a network of repeating aluminum-silicon units, wherein the geopolymerized ash particulates have a sieve size between about a −12 sieve and about a +80 sieve.

2. The animal litter of claim 1, wherein the geopolymerized ash particulates have a sieve size between about a −10 sieve and about a +50 sieve.

3. The animal litter of claim 1, wherein the geopolymerized ash particulates are formed from a pozzolanic ash selected from a fly ash, a bark ash, a bottom ash, a spray dryer ash, a boiler slag, a bottom slag, and mixtures thereof.

4. The animal litter of claim 3, wherein the pozzolanic ash comprises between about 0.1% and about 10% carbon, by weight.

5. The animal litter of claim 3, wherein the geopolymerized ash particulates have a bulk density of less than about 65 lb/ft$^3$.

6. The animal litter of claim 3, wherein the geopolymerized ash particulates are formed with a sufficient amount of an alkaline activator and water to initiate a geopolymerization reaction.

7. The animal litter of claim 1, wherein the geopolymerized ash particulates adhere together to form a clump after being wetted.

8. The animal litter of claim 7, wherein the animal litter comprises a clumping agent.

9. The animal litter of claim 8, wherein the clumping agent comprises bentonite clay or a biopolymer.

10. The animal litter of claim 9 wherein the biopolymer comprises xanthan gum, tapioca starch, corn starch, or any combination of these materials.

11. The animal litter of claim 1, further comprising a urease inhibitor.

12. The animal litter of claim 1, further comprising a pH buffer and/or an odor eliminating agent.

13. The animal litter of claim 1, wherein the geopolymerized ash particulates have an average Brunauer, Emmett and Teller (BET) surface area greater than about 1 m$^2$/g.

14. The animal litter of claim 1, wherein the geopolymerized ash articulates have an average total surface area greater than about 10 m$^2$/g.

15. The animal litter of claim 8, wherein the clumping agent comprises a polysaccharide.

16. The animal litter of claim 8, wherein the clumping agent comprises cellulose.

17. The animal litter of claim 8, wherein the clumping agent comprises sodium alginate.

18. A geopolymerized ash composition used in an animal litter product, the geopolymerized ash comprising:
   geopolymerized ash particulates having a network of repeating aluminum-silicon units, wherein the geopolymerized ash particulates have a sieve size between about a −12 sieve and about a +50 sieve.

* * * * *